United States Patent [19]

Matsui

[11] Patent Number: 4,904,000
[45] Date of Patent: Feb. 27, 1990

[54] CONNECTION FITTING FOR A CORRUGATED TUBE

[75] Inventor: Kazuhiro Matsui, Toyoake, Japan

[73] Assignee: Kitagawa Industries Co., Ltd., Aichi, Japan

[21] Appl. No.: 379,661

[22] Filed: Jul. 13, 1989

Related U.S. Application Data

[63] Continuation of Ser. No. 183,240, Apr. 19, 1988, abandoned.

[30] Foreign Application Priority Data

Apr. 28, 1987 [JP] Japan .................................. 62-64296

[51] Int. Cl.$^4$ .............................................. F16L 33/00
[52] U.S. Cl. .................................... 285/305; 285/423; 285/903
[58] Field of Search ................ 285/7, 283, 332.4, 121, 285/129, 903, 305, 423; 174/92

[56] References Cited

U.S. PATENT DOCUMENTS

| | | | |
|---|---|---|---|
| 221,153 | 11/1879 | Chapin | 285/332.4 |
| 4,368,904 | 1/1983 | Lanz | . |
| 4,591,192 | 5/1986 | Van Exel et al. | 285/305 |
| 4,723,796 | 2/1988 | Nattel | 285/903 |

FOREIGN PATENT DOCUMENTS 58-12514 3/1981 Japan .

Primary Examiner—Randolph A. Reese
Assistant Examiner—Anthony Knight
Attorney, Agent, or Firm—Oliff & Berridge

[57] ABSTRACT

A connection fitting for a corrugated tube has a cylindrical housing for receiving the corrugated tube and a U-shaped locking element for fixing the corrugated tube firmly to the cylindrical housing. The cylindrical housing is provided with a sunken portion on the side surface and slits running circumferentially at a bottom of the sunken portion. The locking element has ribs projecting on its inner surface which penetrate into the slit and engage with the grooves of the corrugated tube. The engaging members are formed on both sides of the sunken portion of the cylindrical housing. Corresponding hook-like elements are formed at both ends of the locking element.

6 Claims, 2 Drawing Sheets

CONNECTION FITTING FOR A CORRUGATED TUBE

This is a continuation of application Ser. No. 183,240, filed Apr. 19, 1988, now abandoned.

BACKGROUND OF THE INVENTION

This invention relates to a connection fitting for a corrugated tube.

A corrugated tube is used as a flexible wire-protecting tube for protecting wires such as wires in a building or wires in transportation machinery.

To join corrugated tubes together or to connect corrugated tube with another member, a connection fitting has been disclosed in U.S. Pat. No. 4,368,904 and Japanese published examined patent application 58-12514.

This type of connection fitting comprises a cylindrical housing for receiving one end of a corrugated tube and a Cshaped locking element. The cylindrical housing is provided with an opening on the circumference wall. In case of inserting the locking element into the opening, plural ribs formed on the inner surface of the locking element engage with grooves of the corrugated tube, and hook-like elements formed at both ends of the locking element engage with frames of the openings. Thus the housing fixes the end of the corrugated tube.

In this prior art, however, width of the opening for receiving the locking element is one-half round of the circumference wall of the cylindrical housing. Therefore, this extensive opening reduces the strength of the housing which may be damaged, or which may be easily knocked free from the corrugated tube by an external force.

SUMMARY OF THE INVENTION

Accordingly, it is an object of the present invention to provide a connection fitting for a corrugated tube which has sufficient strength around its circumference wall of the cylindrical housing, by which the cylindrical housing is not vulnerable to damages and is not easily detached when subjected to external force.

Another object is to fix a connection fitting to a corrugated tube firmly by a simple operation.

To achieve these objects, the present invention is a connection fitting for a corrugated tube which comprises a cylindrical housing for receiving an end of the corrugated tube and a U-shaped locking element. The cylindrical housing is provided with a sunken portion formed on a side surface, a slit divided into two portions and a first engaging member. The slit is formed circumferentially at the bottom of the sunken portion and the first engaging member is formed in the proximity of an end of the sunken portion.

The U-shaped locking element exhibits a projecting rib on its inner surface, corresponding to the slit, and a second engaging member. By inserting the rib projecting from the locking element into the slit of the sunken portion and engaging the the second engaging member with the first engaging member, the rib engages with the groove of the corrugated tube and the corrugated tube is fixed to the cylindrical housing.

BRIEF DESCRIPTION OF THE DRAWINGS

By way of example and to make the description more clear, reference is made to the accompanying drawings in which.

DETAILED DESCRIPTION OF PREFERRED EMBODIMENT

Set forth is an explanation of a preferred embodiment of the present invention based on the attached drawings.

Figure 1:
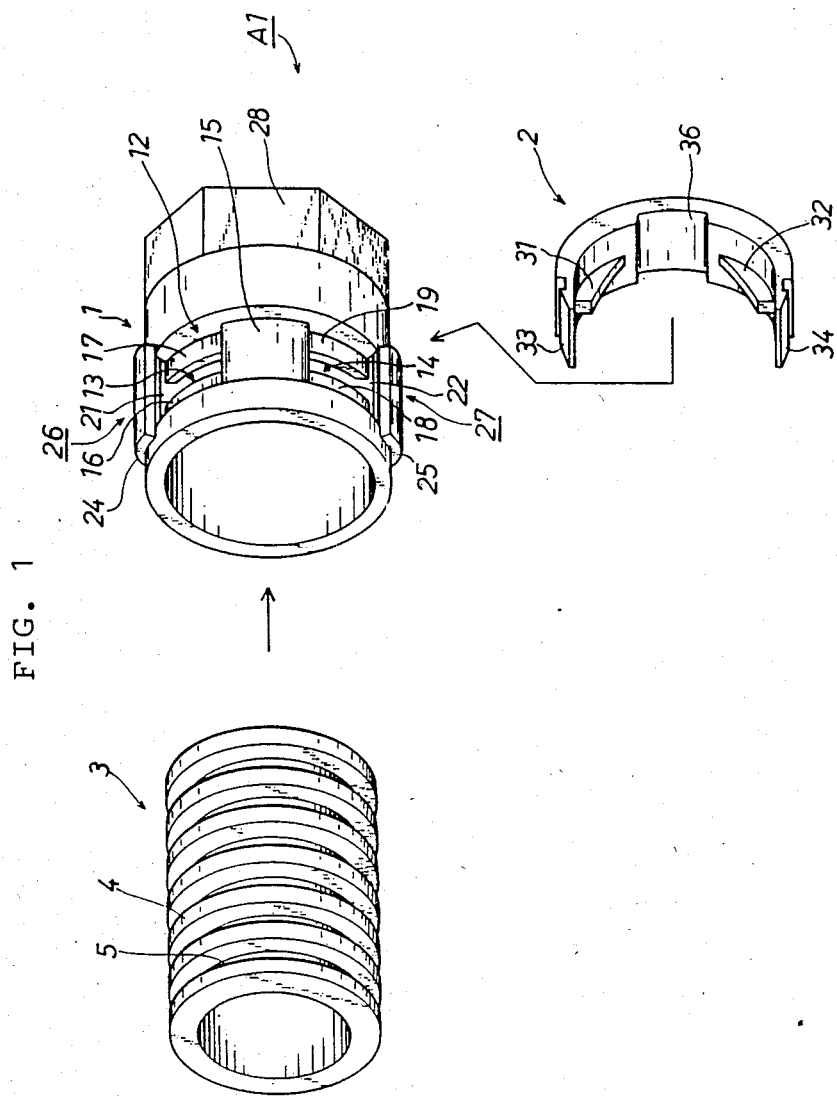
FIG. 1 is a perspective view of a connection fitting and a corrugated tube.

FIG. 1 is a perspective view of a connection fitting for a corrugated tube A1 which includes a cylindrical housing 1, a locking element 2 and a corrugated tube 3. The corrugated tube 3 is provided with many corrugations 4 having grooves 5 around the circumference of the corrugated tube. The cylindrical housing 1 has a bore little larger than an outer diameter of the corrugated tube 3 so as to receive the end of the corrugated tube. The cylindrical housing 1 has a sunken portion 12 on its circumference to receive the locking element 2. From the bottom of the middle part of the sunken portion, a wall element 15 is protruding the wall element having a wall element surface 37, by which two slits 13 and 14 are formed along the circumference of the cylindrical housing. Therefore, there are four side walls 16, 17, 18 and 19 formed on the sunken portion 12. Besides, two openings 21 and 22 are formed on both ends of the sunken portion and covering elements 24 and 25 are formed on the top of them, which constitute the engaging members 26 and 27 for engaging with hook-like elements 33 and 34 of the locking element 2.

Figure 2:
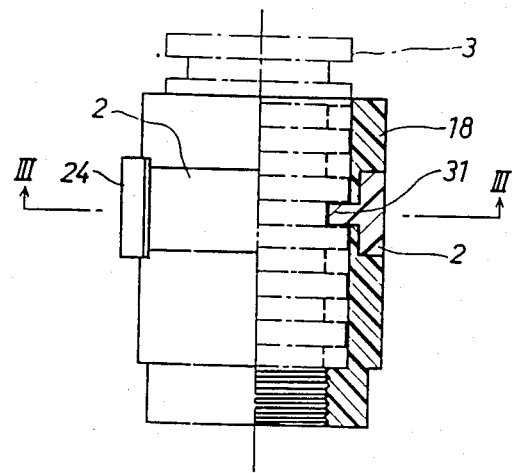
FIG. 2 is a half sectional view explaining how a cylindrical housing, a locking element and a corrugated tube are engaged together.

At the end of the cylindrical housing 1, a threaded portion 28 with a hollow inside is provided. This threaded portion 28 has an internal thread as shown in FIG. 2. The bore of the threaded portion 28 is made smaller than the outer diameter of the corrugated tube 3. When inserting the end of the corrugated tube 3 into the cylindrical housing 1, the end of the corrugated tube doesn't go further than the uneven portion formed at the border of the cylindrical housing 1 and the threaded portion 28 as shown in FIG. 2. An external thread also may be available for the threaded portion 28.

Next, set forth is an explanation of the locking element 2 which has ribs 31 and 32 and hook-like elements 33 and 34. These ribs 31 and 32 are protruding from the inner surface of the locking element 2 for inserting to the slits 13 and 14.

The U-shaped locking element contains a recession 36 having a recession surface 38 in the middle part for being fitted with the wall element 15 of the cylindrical housing 1 so that substantially the entire wall element surface 37 is in contact with the recession surface 38.

The ribs 31 and 32 corresponding to the slits 13 and 14 must be of sufficient length and thickness for penetrating the slits 13 and 14 and must be formed at a determined position for engaging with the grooves 5 of the corrugated tube 3 properly. For example, the ribs 31 and 32 are slightly thinner than the width of the grooves 5 of the corrugated tube 3 and the highest point of the ribs 31 and 32 are almost equal to the depth of the grooves 5 of the corrugated tube 3.

Figure 3:
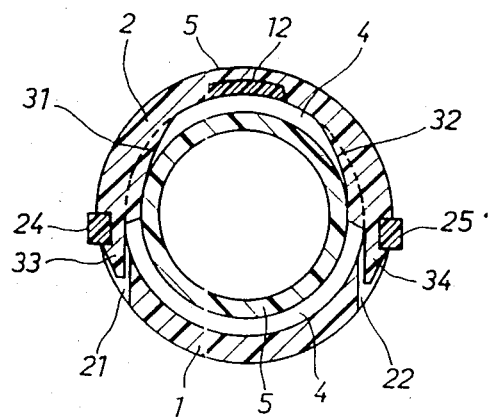
FIG. 3 is a transverse sectional view taken along III—III of FIG. 2.

Set forth is the description how the cylindrical housing 1, the locking element 2 and the corrugated tube 3 are engaged based on the half cross sectional view of FIG. 2 and the transverse sectional view of FIG. 3.

FIG. 2 shows how the locking element 2 and the corrugated tube 3 are engaged together. The end of the corrugated tube 3 is inserted into the cylindrical housing 1 till it touches the uneven portion of the threaded portion 28. When inserting the locking element 2 into the cylindrical housing 1, the rib 32 projecting on the inner surface of the locking element 2 engages with the grooves 5 of the corrugated tube 3 passing through the cylindrical housing 1, thus fixing the corrugated tube 3 firmly.

FIG. 3 shows how the cylindrical housing 1 and the locking element 2 are engaged. In order to fit the locking element 2 with the sunken portion 12 of the cylindrical housing 1, first of all, the hook-like elements 33 and 34 at both ends of the locking element must be engaged with the engaging members 26 and 27 of the cylindrical housing 1. And while inserting the ribs 31 and 32 into the slits 13 and 14, the recession 36 of the locking element 2 fits into the wall element 15.

In this way, the cylindrical housing 1 and the locking element 2 are engaged firmly by said three engaging points which prevent the connection fitting from coming loose. And the corrugated tube 3 is fixed to the connection fitting easily by engaging the U-shaped locking element 2 with the cylindrical housing 1. Furthermore, as opening portions of the cylindrical housing 1 are limited only to the slits 13 and 14 and two openings 21 and 22, such a structure keeps the cylindrical housing strong.

Obviously, many modifications and variations of the present invention are possible in light of the above teaching. It is therefore to be understood that within the scope of the appended claims, the invention may be practiced otherwise than as specifically described.

What is claimed is:

1. A connection fitting for a corrugated tube comprising:
    a cylindrical housing for receiving an end of the corrugated tube, said housing having
    a sunken portion formed on a side surface of the housing, the sunken portion having a circumferential width of about half a circumference of the cylindrical housing,
    a slit divided into two slit portions by a wall element provided in the sunken portion, the wall element having a wall element surface, the two slit portions running circumferentially at a bottom of the sunken portion and
    a pair of covering elements formed at opposite sides of said slit portions; and
    a U-shaped locking element received within the sunken portion for fixing the corrugated tube, said locking element having
    an inner peripheral surface with a rib projecting from the inner peripheral surface of the locking element and divided into two rib portions by a recess in the locking element inner peripheral surface, the two rib portions corresponding to the two slit portions, such that the rib fits into the slit, the rib having a width slightly smaller than a width of the slit in the cylindrical housing for receiving the rib within the slit, the recess corresponding in size to and receiving the wall element such that substantially the entire wall element surface is in contact with the recess, and a pair of hooklike elements for positively engaging with the covering elements.

2. A connection fitting for a corrugated tube according to claim 1 wherein the slit and the rib are respectively and equally divided into two portions.

3. A connection fitting for a corrugated tube according to claim 1 wherein the cylindrical housing has a thread at an end opposite to an end receiving the corrugated tube, with a bore smaller than the outer diameter of the corrugated tube.

4. A connection fitting for a corrugated tube according to claim 1 wherein a height of the rib corresponds to a depth of grooves of the corrugated tube.

5. A connection fitting for a corrugated tube according to claim 1 wherein the width of the slit is the same as that of the rib.

6. A connection fitting for a corrugated tube according to claim 1 wherein the locking element has the same thickness as the depth of the sunken portion.

* * * * *